(12) United States Patent
de Assuncao et al.

(10) Patent No.: US 9,294,363 B2
(45) Date of Patent: Mar. 22, 2016

(54) ADJUSTING QUALITY OF SERVICE IN A CLOUD ENVIRONMENT BASED ON APPLICATION USAGE

(71) Applicant: International Business Machines Corporation, Armonk, NY (US)

(72) Inventors: Marcos Dias de Assuncao, Rio de Janeiro (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/064,909

(22) Filed: Oct. 28, 2013

(65) Prior Publication Data

US 2014/0122707 A1     May 1, 2014

Related U.S. Application Data

(63) Continuation of application No. 13/657,407, filed on Oct. 22, 2012.

(51) Int. Cl.
 *G06F 15/173*     (2006.01)
 *H04L 12/24*     (2006.01)

(52) U.S. Cl.
 CPC ............ *H04L 41/50* (2013.01); *H04L 41/5067* (2013.01); *H04L 41/5096* (2013.01)

(58) Field of Classification Search
 CPC ................................ H04L 41/50; H04L 12/24
 USPC ........................................ 709/225, 224, 223
 See application file for complete search history.

(56) References Cited

U.S. PATENT DOCUMENTS

| | | | |
|---|---|---|---|
| 5,493,692 A | 2/1996 | Theimer | |
| 6,115,640 A | 9/2000 | Tarumi | |
| 8,082,226 B2 | 12/2011 | Ayotte | |
| 8,583,674 B2 * | 11/2013 | Zheleva et al. | 707/767 |
| 8,589,558 B2 * | 11/2013 | Peles et al. | 709/226 |
| 8,612,599 B2 * | 12/2013 | Tung et al. | 709/226 |
| 8,732,291 B2 * | 5/2014 | Zhu et al. | 709/223 |
| 8,931,044 B1 * | 1/2015 | Subramanian | 726/1 |
| 2003/0233464 A1 | 12/2003 | Walpole et al. | |
| 2007/0005783 A1 | 1/2007 | Saint-Hillaire et al. | |

(Continued)

OTHER PUBLICATIONS

Dror G. Feitelson et al., "Parallel Job Scheduling—A Status Report," Proceedings of JSSPP, 2005, pp. 1-9.

(Continued)

*Primary Examiner* — Ario Etienne
*Assistant Examiner* — Sahera Halim
(74) *Attorney, Agent, or Firm* — Louis Percello

(57) ABSTRACT

A system for providing a cloud-based service to an endpoint device includes a resources that provide the service to the device in accordance with a default Quality of Service (QoS) and a processor that monitors usage of the service on the device and automatically adjusts the service on the device in response to the usage, so that the service is provided to the device in accordance with a QoS other than the default QoS at least temporarily. A system for providing a cloud-based service includes an endpoint device that monitors usage of the service on the device and a server that provides the service to the device in accordance with a default QoS and automatically adjusts the service on the device in response to the usage so that the service is provided to the device in accordance with a QoS other than the default QoS at least temporarily.

16 Claims, 6 Drawing Sheets

(56) References Cited

U.S. PATENT DOCUMENTS

| | | |
|---|---|---|
| 2008/0247326 A1 | 10/2008 | Cormier |
| 2009/0059786 A1 | 3/2009 | Budampati |
| 2010/0257143 A1 | 10/2010 | Sosnosky |
| 2010/0325122 A1* | 12/2010 | Yassin ............................ 707/759 |
| 2011/0060808 A1 | 3/2011 | Martin |
| 2011/0134765 A1* | 6/2011 | Rector et al. .................. 370/252 |
| 2011/0137772 A1* | 6/2011 | Davis et al. ..................... 705/34 |
| 2011/0197151 A1 | 8/2011 | Abdo et al. |
| 2011/0238546 A1* | 9/2011 | Certain et al. .................. 705/34 |
| 2012/0230193 A1 | 9/2012 | Fang |
| 2012/0324091 A9* | 12/2012 | Raleigh et al. ................. 709/224 |
| 2013/0007234 A1* | 1/2013 | Bartfai-Walcott et al. ... 709/223 |
| 2013/0132971 A1 | 5/2013 | Assuncao et al. |
| 2013/0159511 A1* | 6/2013 | Backholm et al. ............ 709/224 |
| 2013/0254217 A1* | 9/2013 | Xu ................................. 707/754 |
| 2014/0068212 A1* | 3/2014 | Lin et al. ........................ 711/162 |
| 2014/0095691 A1* | 4/2014 | Ganguli et al. ................ 709/224 |
| 2014/0142013 A1* | 5/2014 | Elomari ......................... 508/463 |

OTHER PUBLICATIONS

Atsuko Takefusa, et al., "A Study of Deadline Scheduling for Client-Server Systems on the Computational Grid," Proceedings of HPDC, 2001, pp. 1-10.

Fernando Koch et al., "Enhanced Deliberation in BDI-Modelled Agents," Proceeding of the 8th International Conference on Practical Applications of Agents and Multi-Agent Systems (PAAMS10). Advances in Intelligent and Soft Computing, pp. 1-10.

Licia Capra et al., "CARISMA: Context-Aware Reflective Middleware System for Mobile Applications," IEEE Transactions on Software Engineering, vol. 29, IEEE Computer Society, 2003, pp. 1-17.

* cited by examiner ially adjust the providing of the cloud-based service on the endpoint device in response to the usage so that the cloud-based service is provided to the endpoint device in accordance with a Quality of Service other than the default Quality of Service for at least a temporary period of time

ADJUSTING QUALITY OF SERVICE IN A CLOUD ENVIRONMENT BASED ON APPLICATION USAGE

CROSS REFERENCE TO RELATED APPLICATIONS

This application is a continuation of co-pending U.S. patent application Ser. No. 13/657,407 filed Oct. 22, 2012, which is herein incorporated by reference in its entirety.

FIELD OF THE DISCLOSURE

The present disclosure relates generally to cloud computing and relates more specifically to maintaining quality of service in cloud computing environments.

BACKGROUND OF THE DISCLOSURE

Cloud computing is the use of computing resources (e.g., hardware and software) that are delivered as a service over a network (e.g., the Internet). Many cloud-based services allow users to offload workloads from user endpoint devices to "the cloud." However, the resources hosted by the cloud are limited, and this makes it difficult to meet the Quality of Service (QoS) demands of all users. These QoS demands may include, for example, service response time (i.e., time to receive requested information). Although some users may pay a premium for better QoS, most users typically subscribe to a standard or default QoS offered by the service providers.

SUMMARY OF THE DISCLOSURE

A system for providing a cloud-based service to an endpoint device includes a plurality of resources that provide the cloud-based service to the endpoint device in accordance with a default Quality of Service and a processor that monitors a usage of the cloud-based service on the endpoint device and automatically adjusts the providing of the cloud-based service on the endpoint device in response to the usage, resulting in the cloud-based service being provided to the endpoint device in accordance with a Quality of Service other than the default Quality of Service for at least a temporary period of time.

In another embodiment, a system for providing a cloud-based service includes an endpoint device that monitors a usage of the cloud-based service on the endpoint device and an application server that provides the cloud-based service to the endpoint device in accordance with a default Quality of Service and automatically adjusts the providing of the cloud-based service on the endpoint device in response to the usage so that the cloud-based service is provided to the endpoint device in accordance with a Quality of Service other than the default Quality of Service for at least a temporary period of time.

Another embodiment of a system for providing a cloud-based service to an endpoint device includes a processor and a computer readable storage medium that stores an executable program that, when executed, cause the processor to provide the cloud-based service to the endpoint device in accordance with a default Quality of Service, monitor a usage of the cloud-based service on the endpoint device, and automatically adjust the providing of the cloud-based service on the endpoint device in response to the usage so that the cloud-based service is provided to the endpoint device in accordance with a Quality of Service other than the default Quality of Service for at least a temporary period of time

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

In one embodiment, the present invention is a method and apparatus for adjusting Quality of Service (QoS) in a cloud environment based on application usage. Embodiments of the invention exploit the fact that situations exist in which users do not notice QoS. In particular, embodiments of the present invention automatically and dynamically adjust QoS to a user based on variations in the user's application usage (e.g., how the user accesses services and applications hosted in the cloud). Accordingly, the present invention detects situations in which a user who subscribes to a standard or default QoS requires a higher QoS based on three main items of data: (1) the applications running on the user's endpoint device, and how the user switches between these applications; (2) associations between the user's time/location and applications accessed by the user; and (3) historical data describing the user's times, locations, and accessed applications. The present invention can then temporarily increase QoS to the user when needed.

Figure 1:
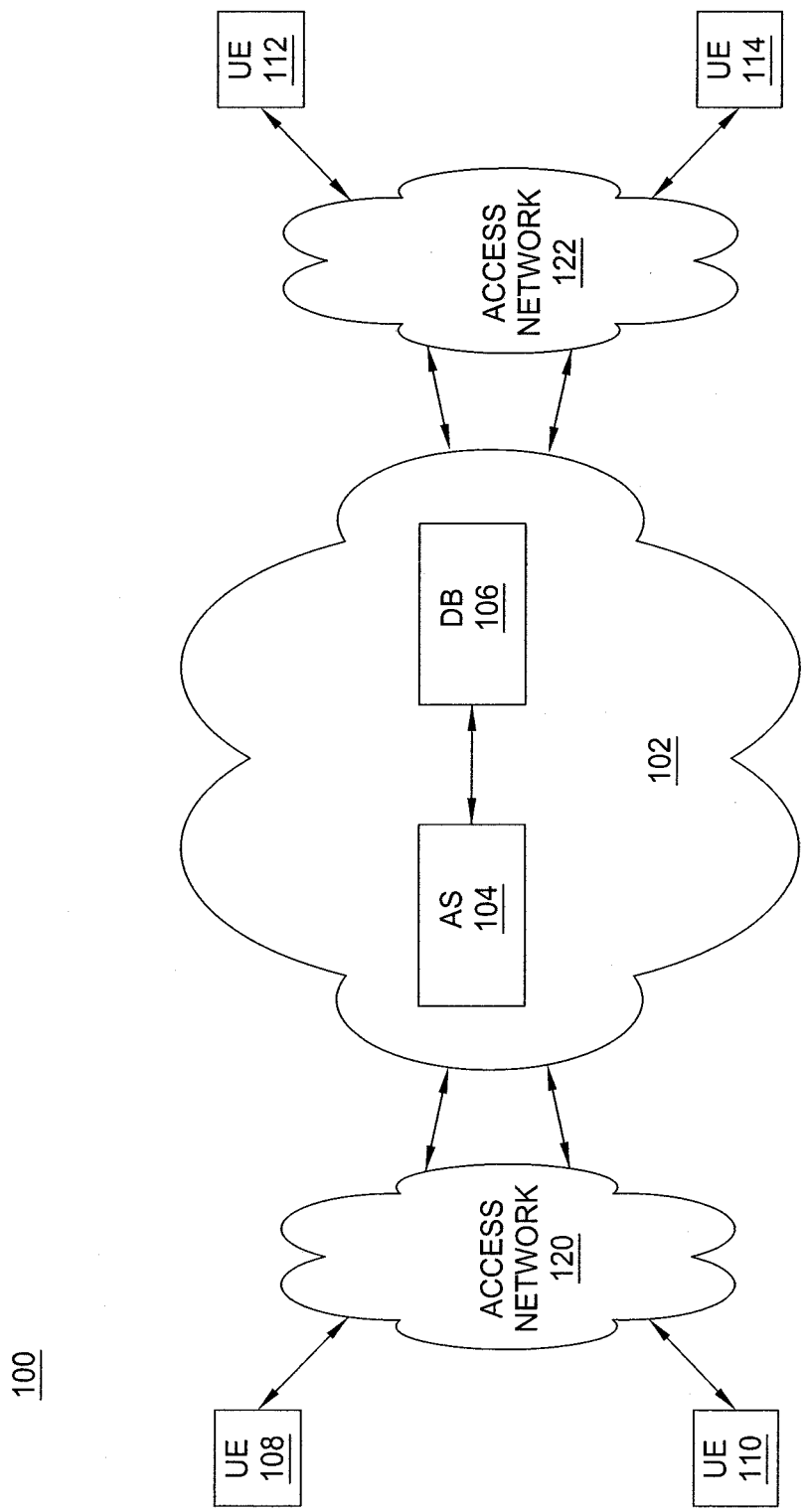
FIG. 1 is a block diagram depicting one example of a network within which embodiments of the present invention may be deployed.

FIG. 1 is a block diagram depicting one example of a network 100 within which embodiments of the present invention may be deployed. The network 100 may be any type of communications network, such as for example, an Internet Protocol (IP) network (e.g., an IP Multimedia Subsystem (IMS) network, an asynchronous transfer mode (ATM) network, a wireless network, a cellular network, a long term evolution (LTE) network, and the like). An "IP network" is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the core network 102 may include an application server (AS) 104 and a database (DB) 106. Although only a single AS 104 and a single DB 106 are illustrated, it should be noted that any number of application servers 104 or databases 106 may be deployed. For instance, the core network 102 may comprise a portion of a cloud environment in which services and applications are supported in a highly distributed manner.

Figure 5:
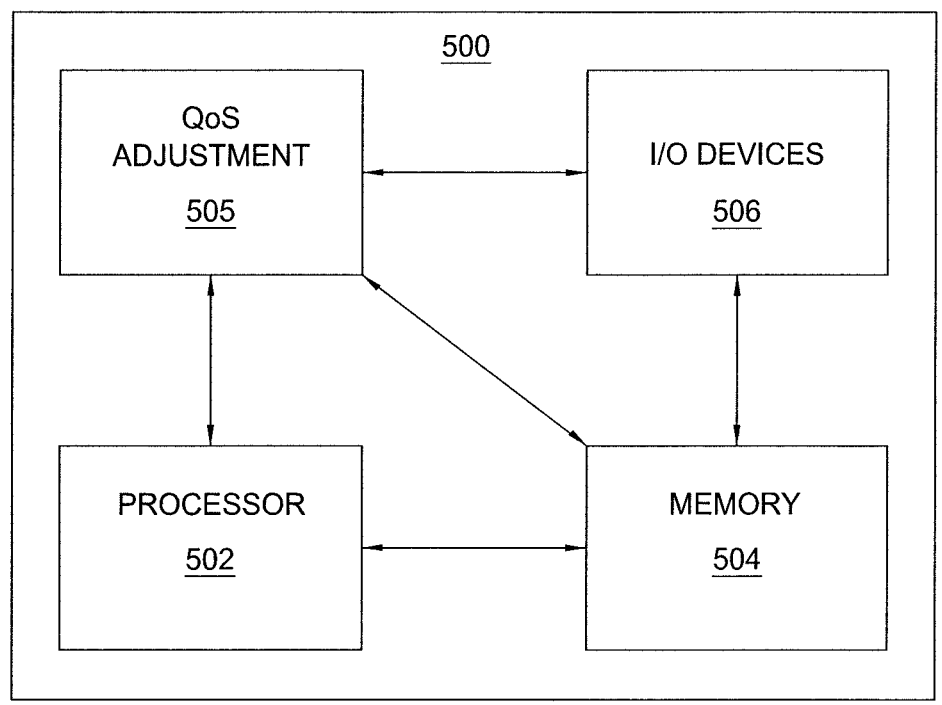
FIG. 5 is a high level block diagram of the present invention implemented using a general purpose computing device.

In one embodiment, the AS 104 may comprise a general purpose computer as illustrated in FIG. 5 and discussed below. In one embodiment, the AS 104 may perform the methods and algorithms discussed below related to improving Quality of Service in a cloud environment. For instance, the AS 104 may comprise a datacenter that supports a cloud-based service (e.g., searching, gaming, data provisioning, maps, etc.).

In one embodiment, the DB 106 stores data relating to users of the cloud-based service supported by the AS 104. For instance, the DB 106 may store profiles for the users. For example, the profiles may include cellular telephone numbers, IP addresses, and the like for each user's endpoint devices. Additionally, the profiles may include historical data relating to the users' usage of cloud-based services and other applications on the endpoint devices. This information and the like may be stored in encrypted form in order to protect the information associated with the users. Furthermore, user authorization may be required in order for the DB 106 to store any information associated with the user.

In one embodiment, the access network 120 may be in communication with one or more user endpoint devices (also referred to as "endpoint devices" or "UE") 108 and 110. In one embodiment, the access network 122 may be in communication with one or more user endpoint devices 112 and 114.

In one embodiment, the user endpoint devices 108, 110, 112 and 114 may be any type of endpoint device that is capable of accessing services from a cloud-based service provider, such as a desktop computer or a mobile endpoint device such as a cellular telephone, a smart phone, a tablet computer, a laptop computer, a netbook, an ultrabook, a portable media device (e.g., an MP3 player), a gaming console, a portable gaming device, and the like. It should be noted that although only four user endpoint devices are illustrated in FIG. 1, any number of user endpoint devices may be deployed. In one embodiment, any of the user endpoint devices may have one or more sensors integrated therein. These sensors may include, for example, location sensors, environmental sensors, acoustic sensors, position sensors, optical sensors, pressure sensors, proximity sensors, and the like. The AS 104 may subscribe to the outputs of these sensors, as discussed in greater detail below.

It should be noted that the network 100 has been simplified. For example, the network 100 may include other network elements (not shown) such as border elements, routers, switches, policy servers, security devices, a content distribution network (CDN) and the like.

Figure 2A:
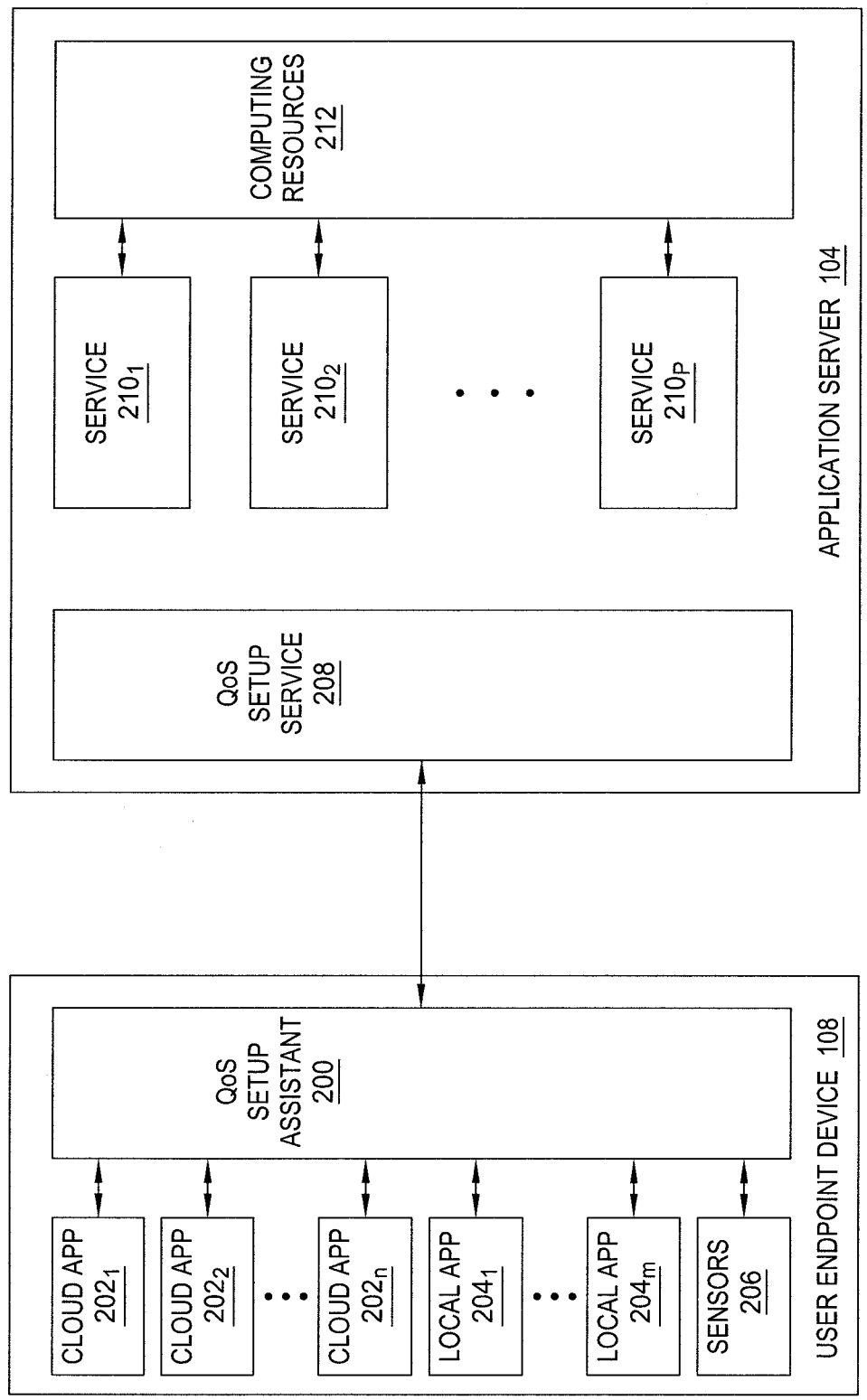
FIG. 2A is a block diagram depicting a first more detailed embodiment of the application server and the exemplary user endpoint device illustrated in FIG. 1.

FIG. 2A is a block diagram depicting a more detailed embodiment of the application server 104 and the exemplary user endpoint device 108 illustrated in FIG. 1. Although the user endpoint device 108 is illustrated in FIG. 2A, any of the user endpoint devices 108-114 could be configured as illustrated in FIG. 2A.

As illustrated, the user endpoint device 108 runs a plurality of applications, including cloud-based applications (or services) $202_1$-$202_n$ (hereinafter collectively referred to as "cloud applications 202") and local applications $204_1$-$204_m$ (hereinafter collectively referred to as "local applications 204"). The cloud applications 202 access remote services (i.e., services hosted on devices other than the user endpoint device 108), while the local applications 204 access local services (i.e., services hosted on the user endpoint device 108). As discussed above, the user endpoint device 108 may also include one or more sensors 206, such as location sensors, environmental sensors, acoustic sensors, position sensors, optical sensors, pressure sensors, proximity sensors.

In addition, the user endpoint device 108 comprises a QoS setup assistant 200 (e.g., a processor) that communicates with the cloud applications 202, the local applications 204, and the sensors 206. As discussed in greater detail below, the QoS setup assistant 200 assists the AS 104 in identifying whether a given cloud application 202 running on the user endpoint device 108 requires a higher QoS than the standard QoS associated with the cloud application 202. The QoS setup assistant 200 relies on data obtained from the cloud applications 202, local applications 204, and sensors 206 (e.g., time and location sensors) to make this determination.

The AS 104 hosts a plurality of cloud-based services $210_1$-$210_p$ (hereinafter collectively referred to as "cloud services 210." The cloud services 210 correspond to at least some of the cloud applications 202 running on the user endpoint device 108. The AS 104 also hosts or has access to a plurality of computing resources 212 (e.g., hardware and/or software resources) that are made available to the cloud services 210 for use in providing the associated services to users.

In addition, the AS 104 comprises a QoS setup service 208 (e.g., a processor). The QoS setup service 208 establishes the QoS for each of the cloud services 210. As discussed in greater detail below, the QoS setup service 208 may adjust the QoS of a given cloud service 210 dynamically in response to data provided by the QoS setup assistant 200 of the user endpoint device 108.

Figure 2B:
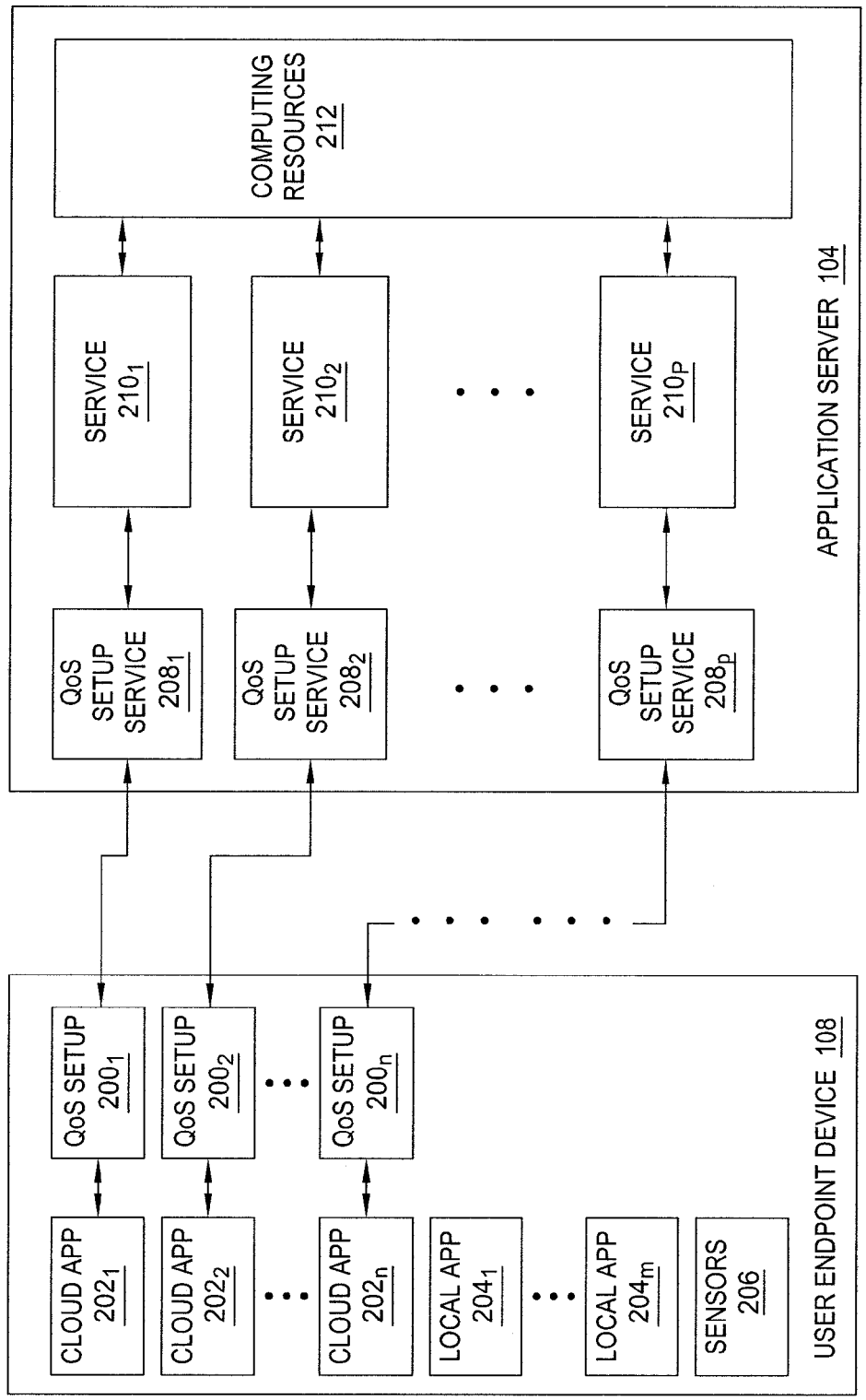
FIG. 2B is a block diagram depicting a second more detailed embodiment of the application server and the exemplary user endpoint device illustrated in FIG. 1.

FIG. 2B is a block diagram depicting a second more detailed embodiment of the application server and the exemplary user endpoint device illustrated in FIG. 1. In particular, FIG. 2B illustrates an embodiment of the invention in which the cloud-based service provider offers Infrastructure-as-a-Service (IaaS). In this case, the AS 104 hosts a plurality of cloud-based services, each of which offers Software-as-a-Service (SaaS).

The user endpoint device 108 is configured in a manner substantially identical to the user endpoint device 108 illustrated in FIG. 2A. Thus, the user endpoint device 108 runs a plurality of applications, including cloud-based applications (or services) $202_1$-$202_n$ (hereinafter collectively referred to as "cloud applications 202") and local applications $204_1$-$204_m$ (hereinafter collectively referred to as "local applications 204"). As discussed above, the user endpoint device 108 may also include one or more sensors 206.

In addition, the user endpoint device 108 comprises an individual QoS setup assistant $200_1$-$200_n$ (hereinafter collectively referred to as "QoS setup assistants 200") associated with each cloud application 202. These individual QoS setup assistants 200 replace the single QoS setup assistant 200 illustrated in FIG. 2A, but operate in a similar manner to the single QoS setup assistant 200. Although the user endpoint device 108 is illustrated in FIG. 2B, any of the user endpoint devices 108-114 could be configured as illustrated in FIG. 2B.

As discussed above, the AS 104 hosts a plurality of cloud-based services $210_1$-$210_p$ (hereinafter collectively referred to as "cloud services 210"), each of which offers Software-as-a-Service (SaaS). The AS 104 also hosts or has access to a plurality of computing resources 212 (e.g., hardware and/or software resources) that are made available to the cloud services 210 for use in providing the associated services to users.

The AS 104 also comprises an individual QoS setup service $208_1$-$208_p$ (hereinafter collectively referred to as "QoS setup services 208") for each of the cloud services 210. The QoS setup service 208 (e.g., a processor) establishes the QoS for each of the cloud services 210. These individual QoS setup services 208 replace the single QoS setup service 208 illustrated in FIG. 2A, but operate in a similar manner to the single QoS setup service 208.

Figure 3:
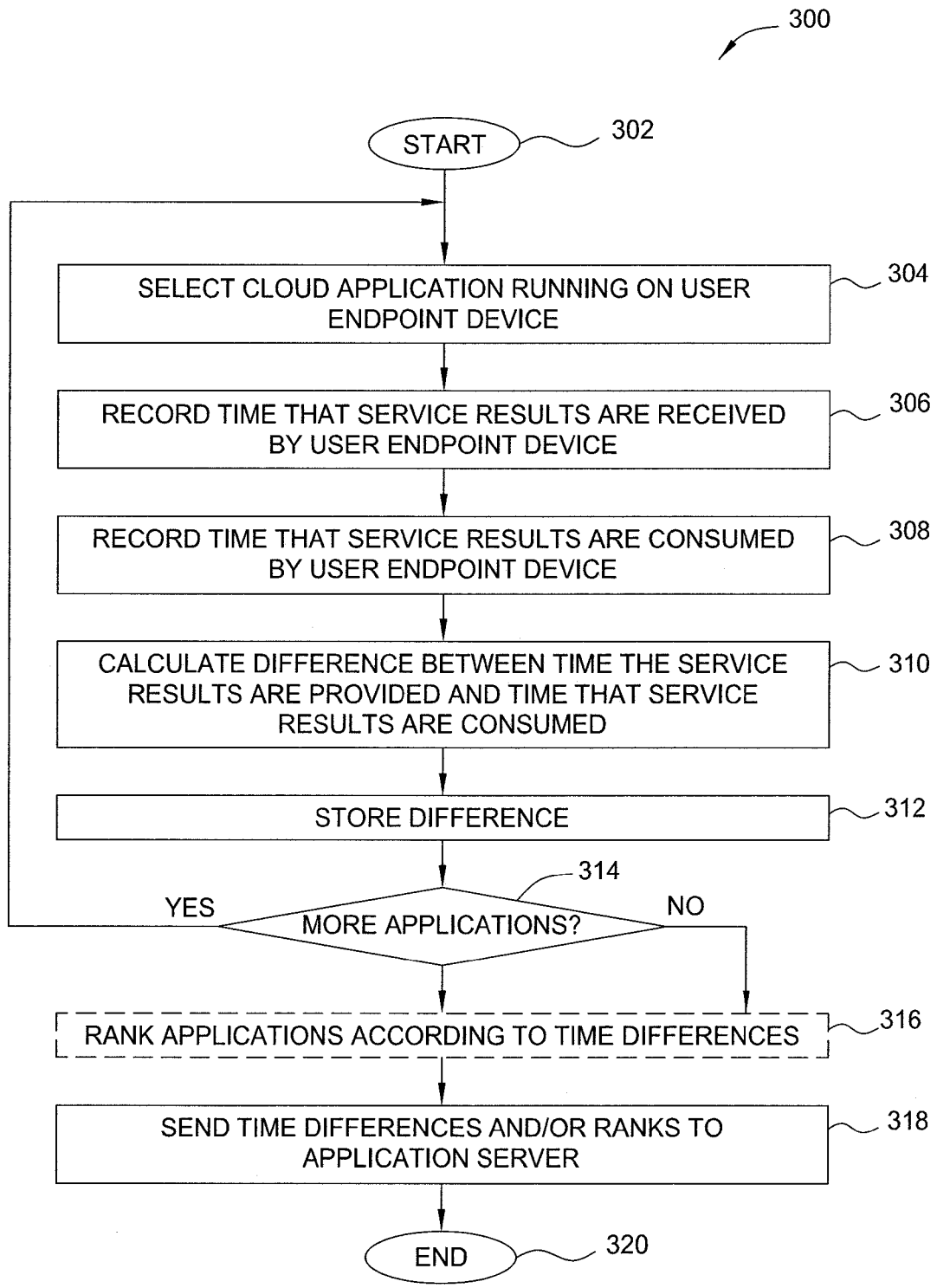
FIG. 3 is a flow diagram illustrating one embodiment of a method for automatically learning the Quality of Service needs of a cloud-based service user, according to the present invention.

FIG. 3 is a flow diagram illustrating one embodiment of a method 300 for automatically learning the QoS needs of a cloud-based service user, according to the present invention. In particular, the method 300 learns how important certain services are to a user and the occasions on which the services are important. As such, in some embodiments, the method 300 is implemented by the QoS setup assistant 200 of any of the user endpoint devices 108-114 illustrated in FIG. 1.

The method 300 begins in step 302. In step 304, the QoS setup assistant 200 selects one of the cloud applications 202 running on the user endpoint device 108. The selected cloud application 202 may comprise, for example, a search application.

In step 306, the QoS setup assistant 200 records a time that service results associated with the selected cloud application 202 are received by the user endpoint device 108 (e.g., from the associated cloud service 210). For instance, where the selected cloud application 202 is a search application, the QoS setup assistant 200 might record the time at which search results (e.g., in the form of a plurality of hyperlinks) are received by the user endpoint device 108. In one embodiment, the QoS setup assistant 200 records multiple times at which service results associated with the selected cloud application 202 are received (e.g., the user may execute multiple different searches).

In step 308, the QoS setup assistant 200 records a time that the service results associated with the selected cloud application 202 are consumed by the user endpoint device 108. For instance, where the service results are search results, the QoS setup assistant 200 might record the time at which the user of the user endpoint device 108 clicked or scrolled through the search results or downloaded or opened a file contained in the search results). In one embodiment, the QoS setup assistant 200 records multiple times at which service results associated with the selected cloud application 202 are consumed (e.g., the user may receive results for multiple different searches).

In step 310, the QoS setup assistant 200 calculates the difference between the time the service results were provided and the time that the service results were consumed. This difference roughly indicates the importance of the selected cloud application 202 to the user of the user endpoint device 108, since users are typically faster to consume service results that are more important to them (e.g., the importance of the selected cloud application 202 is inversely proportional to the difference). In one embodiment, the QoS setup assistant 200 may calculate time differences for multiple different service results received and consumed according to the selected cloud service 202. In this case, the QoS setup assistant 200 may additionally calculate an average time difference (i.e., the average of the time differences calculated individually for each service result).

In step 312, the QoS setup assistant 200 stores the calculated difference. In one embodiment, the calculated difference is stored locally on the user endpoint device 108. In another embodiment, the calculated difference may also be stored remotely in the database 106 illustrated in FIG. 1 (e.g., for use in building a user profile).

In step 314, the QoS setup assistant 200 determines whether there are any cloud applications 202 running on the user endpoint device 108 that have not been evaluated. If the QoS setup assistant 200 concludes in step 314 that there are cloud applications 202 remaining to be evaluated, then the method 300 returns to step 304, and the QoS setup assistant 200 selects a next cloud application 202 for evaluation in accordance with steps 306-312.

Alternatively, if the QoS setup assistant 200 concludes in step 314 that all cloud applications 202 running on the user endpoint device 108 have been evaluated, then the method optionally proceeds to step 316. In optional step 316 (illustrated in phantom), the QoS setup assistant 200 ranks the cloud applications 202 running on the user endpoint device according to the time differences calculated for each cloud application 202. As discussed above, the time difference calculated for a given cloud application 202 roughly indicates the importance of the cloud application 202 to the user. Thus, the relative time differences can indicate the relative importance of the cloud applications 202 running on the user endpoint device 108 to the user. For instance, if the time difference calculated for cloud application $202_1$ is shorter than the time difference calculated for cloud application $202_2$, this may indicate that cloud application $202_1$ is more important to the user then cloud application $202_2$.

In step 318, the QoS setup assistant 200 sends the calculated time differences and/or rankings to the AS 104 (e.g., to the QoS setup service 208 of the AS 104). The method 300 then ends in step 320.

The method 300 therefore helps the QoS setup assistant 200 to learn which cloud applications 202 are most important to the user of the user endpoint device 108. The learning is based on how long it takes the user to consume service results once the service results become available to the user. For instance, the user may switch from cloud application $202_1$ to cloud application $202_2$ and make a request to cloud application $202_2$. If the user switches back to cloud application $202_1$ even though the service results for cloud application $202_2$ have been made available, then this may indicate that cloud application $202_1$ is more important to the user than cloud application $202_2$. If, on the other hand, the user switches back to cloud application $202_1$, but keeps switching back to cloud application $202_2$ to check for service results, then this may indicate that cloud application $202_2$ is more important to the user than cloud application $202_1$.

Figure 4:
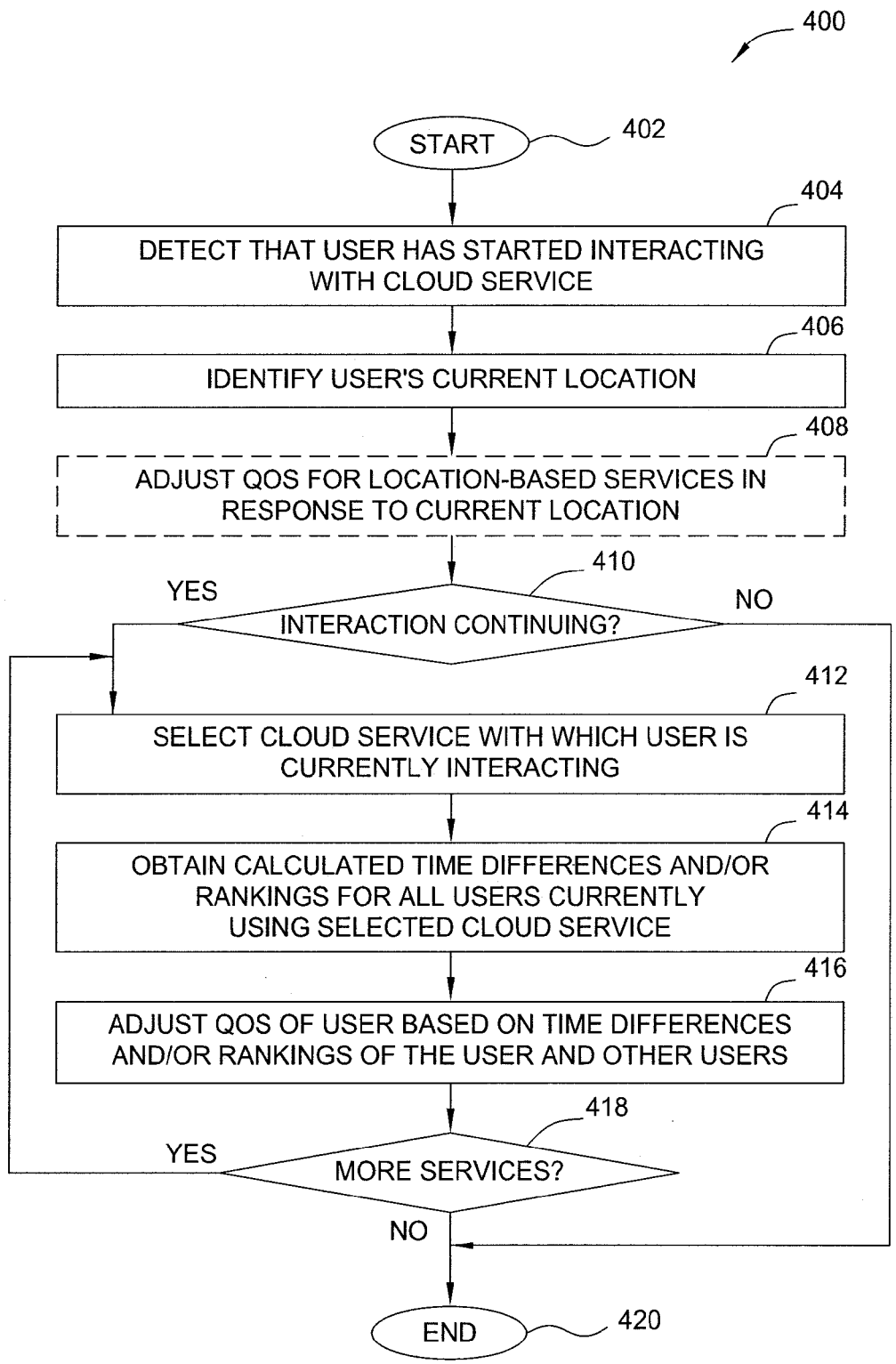
FIG. 4 is a flow diagram illustrating one embodiment of a method for establishing a Quality of Service for a cloud-based service user, according to the present invention.

FIG. 4 is a flow diagram illustrating one embodiment of a method 400 for establishing a QoS for a cloud-based service user, according to the present invention. In particular, the method 400 assigns a QoS to a cloud-based application used by the user, based on how important the cloud-based application is to user at a given time. As such, in some embodiments, the method 400 is implemented by the QoS setup service 208 of any of the AS 104 illustrated in FIG. 1.

The method 400 begins in step 402. In step 404, the QoS setup service 208 detects that a user has started interacting with a cloud service 210. As described above, the cloud service 210 may correspond to a cloud-based application 202 running on a user endpoint device 108 operated by the user.

In step 406, the QoS setup service 208 identifies the location from which the user is interacting with the cloud service 210. As discussed above, the location may be obtained from one or more sensors integrated in the user endpoint device 108. The user's location is relevant because the user's current location may have bearing on whether the user requires urgent access to the cloud service 210 (e.g., if the user's current location is a location that is unusual for the user and/or is generally considered to be dangerous). In one embodiment, the user must consent to his or her current location being shared with the QoS setup service 208.

In optional step 408 (illustrated in phantom), the QoS setup service 208 adjusts the QoS to the user for cloud services 210 that consume information about user location. For example, if the user's current location is a location that is unfamiliar to the user or that is generally considered to be dangerous, the QoS setup service 208 may increase the QoS above a standard or default level to the user for cloud services 210 that consume information about user location, since the user may urgently require data from these services.

In step 410, the QoS setup service 208 determines whether the user is continuing to interact with the cloud service 210. If the QoS setup service 208 concludes in step 410 that the user is not continuing to interact with the cloud service 210, then the method ends in step 420. In one embodiment, the QoS setup service 208 may restore any adjusted QoS to standard or default levels before the method 400 ends.

Alternatively, if the QoS setup service 208 concludes in step 410 that the user is continuing to interact with the cloud service 210, then the method 400 proceeds to step 412. In step 412, the QoS setup service 208 selects a cloud service 210 with which the user is currently interacting (e.g., for which a corresponding cloud application 202 is currently running on the user endpoint device 108).

In step 414, the QoS setup service 208 obtains the time differences and/or rankings calculated by the QoS setup assistants 200 of the user endpoint devices of all users currently interacting with the selected cloud service 210. In one embodiment, the time differences and/or rankings are obtained directly from the QoS setup assistant 200, although in other embodiments the time differences and/or rankings could be retrieved from the database 106. In another embodiment, the time differences and/or rankings may have been previously obtained by the QoS setup service 208 and stored locally on the AS 104.

In step 416, the QoS setup service 208 adjusts the QoS level provided to the user of the user endpoint device 108 for the selected cloud service 210, based on the time differences and/or rankings associated with the user and the other users currently interacting with the selected cloud service 210. For instance, if the user of the user endpoint device 108 is relatively fast to consume service results associated with the cloud service 210 compared to other users, then the QoS level provided to the user of the user endpoint device 108 may be increased for the selected cloud service 210 (e.g., increased beyond a standard or default level).

In step 418, the QoS setup service 208 determines whether any currently active cloud services remain to be evaluated. If the QoS setup service 208 concludes in step 418 that there are cloud services 210 remaining to be evaluated, then the method 400 returns to step 412, and the QoS setup service 208 selects a next cloud service 210 for evaluation in accordance with steps 212-216.

Alternatively, if the QoS setup service 208 concludes in step 418 that all currently active cloud services 210 have been evaluated, then the method ends in step 420.

Embodiments of the present invention thus learn which cloud-based services are most important to particular users and when those cloud-based applications are most important. Using this information, the present invention can dynamically adjust the QoS level that is associated with a particular user and a particular cloud-based service at the times when the increased QoS is most needed; at all other times, the QoS may be restored to a standard or default level, thus making it possible to increase QoS to other users who may need increased QoS at that time. Services to users may therefore be improved from both a service consumability and a safety standpoint.

For instance, a user may have two cloud based applications open on his user endpoint device: (1) an online game; and (2) a voice-controlled application that answers questions using a server in the cloud. Both applications consume bandwidth and processing resources on the user endpoint device and are supported by the same cloud service provider. While the user is playing the game, he may decide to ask the voice-controlled application to check his calendar for the day. Embodiments of the present invention can detect that the user is still playing the game while asking for the calendar check, and can deduce that the calendar check is probably not as important as the game is to the user at the current time. Thus, the request for the calendar check can be prioritized according to other voice-controlled requests received from other users during the same window of time. Those requests that are prioritized more highly can be addressed in accordance with a higher QoS relative to the other requests.

As another example, a user may currently be located in a dangerous suburb of a large metropolitan area. Embodiments of the present invention can identify his current location (e.g., global positioning system coordinates) and compare it to other locations that the user has visited previously. Embodiments of the present invention can further deduce that the user's current location is not a location that the user normally visits and can increase the QoS to the user for services that relate to location (e.g., such as locating local businesses and downloading maps and local information).

FIG. 5 is a high level block diagram of the present invention implemented using a general purpose computing device 500. In one embodiment, the general purpose computing device 500 is deployed as an application server, such as the AS 104 illustrated in FIG. 1, or as a user endpoint device, such as the user endpoint devices 108-114 illustrated in FIG. 1. It should be understood that embodiments of the invention can be implemented as a physical device or subsystem that is coupled to a processor through a communication channel. Therefore, in one embodiment, a general purpose computing device 500 comprises a processor 502, a memory 504, a QoS adjustment module 505, and various input/output (I/O) devices 506 such as a display, a keyboard, a mouse, a modem, a microphone, speakers, a touch screen, an adaptable I/O device, and the like. In one embodiment, at least one I/O device is a storage device (e.g., a disk drive, an optical disk drive, a floppy disk drive).

Alternatively, embodiments of the present invention (e.g., QoS adjustment module 505) can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the QoS adjustment module 505 for dynamically adjusting the QoS of a cloud-based application described herein with reference to the preceding Figures can be stored on a tangible or non-transitory computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A system for providing data to an endpoint device via a cloud-based service, wherein the cloud-based service is one of a plurality of cloud-based services running on the endpoint device, the system comprising:
    a plurality of resources accessible by the cloud-based service for use in transmitting the data over a network to the endpoint device, wherein a manner in which the data is transmitted to the endpoint device is governed by a default Quality of Service; and
    a processor that monitors a manner in which the cloud-based service is used by the endpoint device in order to learn how important the cloud-based service is to a user of the endpoint device, wherein how important the cloud-based service is to the user is relative to importances of others of the plurality of cloud-based services and is determined by calculating, for each of the plurality of cloud-based services, a time difference between a time that data provided by the each of the plurality of cloud-based services are received by the endpoint device and a time that the data provided by the each of the cloud-based services is consumed by the endpoint device, inferring an importance of the each of the plurality of cloud-based services that is inversely proportional to the time difference, and ranking the plurality of cloud-based services according to the inferred importance, and wherein the processor automatically adjusts the providing of the data via the cloud-based service to the endpoint device in response to how important the cloud-based service is to the user so that the cloud-based service transmits the data to the endpoint device in a manner governed by a Quality of Service that is different from the default Quality of Service for at least a temporary period of time.

2. The system of claim 1, wherein the system comprises an application server connected to the endpoint device over a network.

3. A system comprising:
    an endpoint device that monitors a manner in which data received from the cloud-based service over a network is used by a user of the endpoint device, wherein the cloud-based service is one of a plurality of cloud-based services running on the endpoint device; and
    an application server via which the cloud-based service transmits the data to the endpoint device, wherein a manner in which the data is transmitted to the endpoint device is governed by a default Quality of Service, wherein the application server automatically adjusts transmission of the data to the endpoint device in response to how important the cloud-based service is to the user of the endpoint device, wherein how important the cloud-based service is to the user is relative to importances of others of the plurality of cloud-based services and is determined by calculating, for each of the plurality of cloud-based services, a time difference between a time that data provided by the each of the plurality of cloud-based services is received by the endpoint device and a time that the data provided by the each of the cloud-based services is consumed by the endpoint device, inferring an importance of the each of the plurality of cloud-based services that is inversely proportional to the time difference, and ranking the plurality of cloud-based services according to the inferred importance, so that the data is provided by the cloud-based service to the endpoint device in a manner governed by a Quality of Service that is different from the default Quality of Service for at least a temporary period of time.

4. The system of claim 3, wherein the endpoint device is connected to the application server over a network.

5. The system of claim 3, wherein the endpoint device includes a location sensor.

6. A system for providing data to an endpoint device via a cloud-based service, wherein the cloud-based service is one of a plurality of cloud-based services running on the endpoint device, the system comprising:
    a processor; and
    a non-transitory computer readable storage medium that stores an executable program that, when executed, cause the processor to perform steps comprising:
        providing the data via the cloud-based service to the endpoint device, wherein a manner in which the data is transmitted over a network to the endpoint device is governed by a default Quality of Service;
        monitoring a manner in which the data transmitted by the cloud-based service is used by the endpoint device, wherein the monitoring comprises learning an importance of the cloud-based service to a user of the endpoint device, wherein how important the cloud-based service is to the user is relative to importances of others of the plurality of cloud-based services, and wherein how important the cloud-based service is to the user is based at least on a current location of the user, wherein the current location indicates whether the user requires urgent access to the data transmitted by the cloud-based service, and wherein the learning comprises ranking the plurality of cloud-based services according to importance to the user, wherein the ranking comprises:
            calculating, for each of the plurality of cloud-based services, a time difference between a time that data provided by the each of the plurality of cloud-based services are received by the endpoint device and a time that the data provided by the each of the cloud-based services is consumed by the endpoint device; and
            inferring an importance of the each of the plurality of cloud-based services that is inversely proportional to the time difference; and
        automatically adjusting the providing the data via the cloud-based service to the endpoint device in response to how important the cloud-based service is to the user, so that the cloud-based service transmits the data to the endpoint device in a manner governed by a Quality of Service that is different from the default Quality of Service for at least a temporary period of time.

7. The system of claim 6, wherein the automatically adjusting comprises:
providing the data to the endpoint device in a manner governed by a greater Quality of Service than the default Quality of Service, when the cloud-based service is ranked highly relative to the others of the plurality of cloud-based services.

8. The system of claim 6, wherein the time difference is an average time difference for the each of the plurality of cloud-based services.

9. The system of claim 6, wherein the learning comprises:
observing a manner in which the user switches between the plurality of cloud-based services.

10. The system of claim 6, wherein the cloud-based service is one of a plurality of cloud-based services provided to a plurality of endpoint devices including the endpoint device, and how important the cloud-based service is to the user is relative to importances of others of the plurality of cloud-based services to relative users of others of the plurality of endpoint devices.

11. The system of claim 6, wherein the learning comprises:
identifying the current location of the user; and
inferring that a greater Quality of Service than the default Quality of Service should be used by the cloud-based service to transmit the data to the endpoint device, based on the current location of the user.

12. The system of claim 11, wherein the executable program further causes the processor to perform steps comprising:
providing the data via the cloud-based service to the endpoint device in a manner governed by the greater Quality of Service, at least temporarily.

13. The system of claim 11, wherein the cloud-based service is a service that relates to location.

14. The system of claim 11, wherein the current location of the user is a location that is unfamiliar to the user.

15. The system of claim 11, wherein the current location of the user is a dangerous location.

16. The system of claim 6, wherein the default Quality of Service causes the cloud-based service to provide the data in accordance with a first response time, and the adjusting includes providing the data in accordance with a second response time that is shorter than the first response time.

* * * * *